United States Patent
Mathew et al.

(10) Patent No.: US 10,257,205 B2
(45) Date of Patent: *Apr. 9, 2019

(54) TECHNIQUES FOR AUTHENTICATION LEVEL STEP-DOWN

(71) Applicant: Oracle International Corporation, Redwood Shores, CA (US)

(72) Inventors: Stephen Mathew, Bangalore (IN); Ramya Subramanya, Bangalore (IN); Aarathi Balakrishnan, Bangalore (IN); Vipin Anaparakkal Koottayi, Trikarpur (IN); Madhu Martin, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/294,381

(22) Filed: Oct. 14, 2016

(65) Prior Publication Data
US 2017/0118223 A1    Apr. 27, 2017

Related U.S. Application Data

(60) Provisional application No. 62/245,209, filed on Oct. 22, 2015.

(51) Int. Cl.
*H04L 29/06* (2006.01)
*G06F 21/31* (2013.01)
(Continued)

(52) U.S. Cl.
CPC ............ *H04L 63/105* (2013.01); *G06F 21/31* (2013.01); *G06F 21/45* (2013.01); *G06F 21/554* (2013.01);
(Continued)

(58) Field of Classification Search
CPC ... H04L 63/105; H04L 63/083; H04L 63/102; H04L 63/0815; G06F 21/41; G06F 2221/2113
See application file for complete search history.

(56) References Cited

U.S. PATENT DOCUMENTS 6,246,769 B1    6/2001  Kohut
6,412,077 B1 *  6/2002  Roden .................. H04L 67/141
                                                      714/4.21

(Continued)

FOREIGN PATENT DOCUMENTS

CN    104660412 A    5/2015
EP    2743857       6/2014
(Continued)

OTHER PUBLICATIONS

"Single Sign-On (SSO)" [site visited Jun. 22, 20015] https://support.ca.com/cadocs/0/CA%20SiteMinder%2012%2052%20SP1-ENU/Bookshelf_Files/HTML/idocs/index.htm?toc.htm?256655.html?intcmp=searchresultclick&resultnum=817, 5 pages.

(Continued)

*Primary Examiner* — David Garcia Cervetti
(74) *Attorney, Agent, or Firm* — Kilpatrick Townsend & Stockton LLP

(57) ABSTRACT

Techniques are disclosed to modify the authentication level of a session providing access to resources. In some embodiments, an access management system is configurable to enable voluntary (e.g., request by a user) or involuntary (e.g., by the access management system) reduce, or "step-down" the authentication level for a session if a lower authentication level exists. For example, an access management system may be configured to enable a user to request a step-down of the authentication level of a session to prevent access to resources at a higher authentication level. By reducing the authentication level to a lower authentica- (Continued)

tion level, a user may be prompted to provide credentials for authentication according to the authentication schemes defined for higher authentication levels. These techniques can reduce, if not prevent, unauthorized access to protected resources by challenging a user for credentials to authenticate to higher authentication levels.

9 Claims, 6 Drawing Sheets

(51) Int. Cl.
    *G06F 21/45*     (2013.01)
    *G06F 21/55*     (2013.01)
    *G06F 21/62*     (2013.01)

(52) U.S. Cl.
    CPC ........ *G06F 21/6218* (2013.01); *H04L 63/083* (2013.01); *H04L 63/0815* (2013.01); *H04L 63/102* (2013.01)

(56) References Cited

U.S. PATENT DOCUMENTS

| | | | |
|---|---|---|---|
| 6,609,198 B1 * | 8/2003 | Wood | G06F 21/31 713/155 |
| 6,892,307 B1 | 5/2005 | Wood et al. | |
| 6,950,949 B1 | 9/2005 | Gilchrist | |
| 7,020,084 B1 * | 3/2006 | Tanaka | H04L 12/14 370/235 |
| 7,086,085 B1 | 8/2006 | Brown et al. | |
| 7,523,309 B1 * | 4/2009 | Talbot | H04L 63/105 713/164 |
| 7,562,222 B2 | 7/2009 | Gasparini et al. | |
| 7,574,212 B2 * | 8/2009 | McConnell | H04L 29/06027 370/331 |
| 7,724,700 B1 * | 5/2010 | Grayson | H04L 41/5019 370/328 |
| 7,904,946 B1 | 3/2011 | Chu et al. | |
| 8,010,996 B2 | 8/2011 | Cline et al. | |
| 8,122,251 B2 | 2/2012 | Santos et al. | |
| 8,141,140 B2 * | 3/2012 | Wenzel | H04L 63/0815 713/182 |
| 8,156,536 B2 * | 4/2012 | Polk | H04L 63/0428 709/225 |
| 8,180,666 B2 * | 5/2012 | Minert | G06Q 10/06311 379/265.01 |
| 8,204,808 B2 * | 6/2012 | Amaitis | G06Q 40/00 705/35 |
| 8,281,379 B2 | 10/2012 | Noe | |
| 8,302,167 B2 | 10/2012 | Mennes et al. | |
| 8,312,519 B1 | 11/2012 | Bailey et al. | |
| 8,327,422 B1 | 12/2012 | Friedman et al. | |
| 8,339,954 B2 * | 12/2012 | Dahod | H04L 47/10 370/231 |
| 8,453,224 B2 | 5/2013 | Mutt | |
| 8,555,355 B2 | 10/2013 | Rathbun | |
| 8,578,476 B2 | 11/2013 | Sama | |
| 8,584,196 B2 * | 11/2013 | Rafiq | G06F 21/604 370/392 |
| 8,625,796 B1 | 1/2014 | Ayed | |
| 8,627,438 B1 | 1/2014 | Bhimanaik | |
| 8,671,444 B2 * | 3/2014 | Kulkarni | H04L 63/0876 726/20 |
| 8,677,464 B2 * | 3/2014 | Smith | G06F 21/41 713/153 |
| 8,763,097 B2 | 6/2014 | Bhatnagar et al. | |
| 8,843,997 B1 * | 9/2014 | Hare | H04L 63/0281 709/200 |
| 8,856,892 B2 | 10/2014 | Faludi | |
| 8,863,270 B2 * | 10/2014 | Masiyowski | H04L 63/105 713/151 |
| 8,875,242 B2 * | 10/2014 | Choi | H04L 63/0815 713/152 |
| 8,898,765 B2 | 11/2014 | Goyal et al. | |
| 9,083,691 B2 * | 7/2015 | Banford | H04L 63/08 |
| 9,130,903 B2 * | 9/2015 | Ryman | H04L 67/025 |
| 9,554,389 B2 * | 1/2017 | Anchan | H04W 76/40 |
| 9,560,076 B2 * | 1/2017 | Schultz | G06F 21/6236 |
| 9,864,944 B2 | 1/2018 | Radu et al. | |
| 9,912,810 B2 * | 3/2018 | Segre | H04M 3/5191 |
| 2003/0070091 A1 * | 4/2003 | Loveland | H04L 63/104 726/12 |
| 2004/0128561 A1 | 7/2004 | Bouchat et al. | |
| 2004/0167984 A1 * | 8/2004 | Herrmann | H04L 63/08 709/229 |
| 2004/0215750 A1 * | 10/2004 | Stilp | G06K 7/0008 709/220 |
| 2005/0015594 A1 * | 1/2005 | Ashley | G06F 21/31 713/168 |
| 2005/0156947 A1 | 7/2005 | Sakai et al. | |
| 2006/0056415 A1 | 3/2006 | Lee et al. | |
| 2006/0145842 A1 * | 7/2006 | Stilp | G05B 9/03 340/539.22 |
| 2006/0274920 A1 * | 12/2006 | Tochikubo | G06F 21/32 382/124 |
| 2007/0136573 A1 | 6/2007 | Steinberg et al. | |
| 2007/0199053 A1 | 8/2007 | Sandhu et al. | |
| 2007/0200597 A1 | 8/2007 | Oakland | |
| 2008/0148351 A1 * | 6/2008 | Bhatia | G06F 21/6218 726/2 |
| 2009/0037763 A1 * | 2/2009 | Adhya | H04L 12/4641 714/4.12 |
| 2009/0288148 A1 | 11/2009 | Headley et al. | |
| 2009/0292927 A1 * | 11/2009 | Wenzel | G06F 21/41 713/185 |
| 2010/0146263 A1 | 6/2010 | Das et al. | |
| 2011/0320616 A1 * | 12/2011 | Wray | H04L 63/102 709/228 |
| 2011/0320820 A1 * | 12/2011 | Wray | G06F 21/31 713/176 |
| 2012/0066749 A1 | 3/2012 | Taugbol et al. | |
| 2012/0203906 A1 * | 8/2012 | Jaudon | H04W 76/20 709/225 |
| 2012/0314862 A1 * | 12/2012 | Min | H04L 9/3215 380/255 |
| 2013/0111208 A1 | 5/2013 | Sabin et al. | |
| 2013/0159732 A1 | 6/2013 | Leoutsarakos et al. | |
| 2013/0185209 A1 | 7/2013 | Ahn | |
| 2013/0198613 A1 | 8/2013 | Scoda | |
| 2013/0205373 A1 * | 8/2013 | Jaudon | H04W 4/06 726/4 |
| 2013/0219479 A1 | 8/2013 | DeSoto et al. | |
| 2013/0290719 A1 | 10/2013 | Kaler et al. | |
| 2014/0082706 A1 * | 3/2014 | Banford | H04L 67/145 726/5 |
| 2014/0096190 A1 | 4/2014 | Subramanya et al. | |
| 2014/0208386 A1 * | 7/2014 | Sama | H04L 63/14 726/4 |
| 2014/0214688 A1 | 7/2014 | Weiner et al. | |
| 2014/0250490 A1 | 9/2014 | Baca et al. | |
| 2014/0279445 A1 | 9/2014 | Jiang et al. | |
| 2015/0121503 A1 * | 4/2015 | Xiong | G06F 21/41 726/8 |
| 2015/0150110 A1 * | 5/2015 | Canning | H04L 63/0807 726/9 |
| 2015/0222615 A1 | 8/2015 | Allain et al. | |
| 2015/0249540 A1 | 9/2015 | Khalil et al. | |
| 2015/0304847 A1 | 10/2015 | Gong et al. | |
| 2016/0063226 A1 * | 3/2016 | Singh | G06F 21/30 726/3 |
| 2016/0065554 A1 * | 3/2016 | Brown | G06F 21/629 726/1 |
| 2016/0285871 A1 | 9/2016 | Chathoth et al. | |
| 2016/0379431 A1 * | 12/2016 | Borg | G07C 9/00706 340/5.28 |
| 2017/0034152 A1 * | 2/2017 | Subramanya | H04L 63/0815 |
| 2017/0118025 A1 | 4/2017 | Shastri et al. | |
| 2017/0118202 A1 | 4/2017 | Mathew et al. | |

(56) References Cited

U.S. PATENT DOCUMENTS

| | | | |
|---|---|---|---|
| 2017/0118223 A1* | 4/2017 | Mathew | H04L 63/105 |
| 2017/0126733 A1 | 5/2017 | Mathew et al. | |
| 2018/0027006 A1* | 1/2018 | Zimmermann | H04L 63/0245 726/11 |

FOREIGN PATENT DOCUMENTS

| | | |
|---|---|---|
| WO | 2012156785 A1 | 11/2012 |
| WO | 2014041336 A1 | 3/2014 |
| WO | 2017070412 | 4/2017 |

OTHER PUBLICATIONS

"Mapping Fed Authn Methods to Authn Levels in OIF / SP" http://prsync.com/oracle/mapping-fed-authn-methods-to-authn-levels-in-oif--sp-624805/ (Jul. 17, 2014), 5 pages.
Puhalla "OpenAM Session Upgrade" http://blog.profiq.cz/2012/09/21/openam-session-upgrade-overview/(Sep. 21, 2012), 3 pages.
"OpenID Connect Single Sign-On (SSO)" Connect2id Ltd. http://connect2id.com/products/server/single-sign-on (Copyright 2015), 1 page.
"Configuring Authentication Mechanisms" SAP SE [site visited Jun. 22, 20015] https://help.sap.com/saphelp_nw70ehp1/helpdata/en/8f/ae29411ab3db2be10000000a1550b0/frameset.htm 2 pages.
International Application No. PCT/US2016/058016, International Search Report and Written Opinion dated Dec. 7, 2016, 13 pages.
U.S. Appl. No. 14/671,935 , Final Office Action dated Mar. 23, 2017, 24 pages.
"Non-Final Office Action" issued in U.S. Appl. No. 14/920,807, dated Feb. 1, 2018, 19 pages.
U.S. Appl. No. 14/671,935, Non-Final Office Action dated Aug. 28, 2017, 26 pages.
Non-Final Office Action for U.S. Appl. No. 14/671,935 dated Sep. 22, 2016, 22 pages.
Dhamija et al., "Phish and HIPs: Human Interactive Proofs to Detect Phishing Attacks", Second International Workshop on Human Interactive Proofs (HIP 2005), pp. 127-141 (May 1, 2005).
DirX Access V8.3 Web Access Management and Identity Federation. Technical Data Sheet [online]. Dec. 2013, Copyright 2013 Atos [retrieved on Sep. 4, 2014]. Retrieved from the Internet: <URL: http://atos.net/content/dam/global/documents/we-do/atos-dirx-access-v83-datasheet.pdf>, 14 pages.
eToken 3500—OTP Banking Token. safenet-inc.com [online]. Copyright 2006-2015 Gemalto NV [site visited Sep. 4, 2014]. Retrieved from the Internet: <URL: http:// www.safenet-inc.com/multi-factor-authentication/authenticators/one-time-password-otp/etoken-3500-banking-token/#content-left>, 2 pages.
HSBC Internet Banking Terms and Conditions. hsbc.co.in [online]. Copyright 2015, The Hongkong and Shanghai Banking Corporation Limited, India (HSBC India) [site visited Sep. 4, 2014]. Retrieved from the Internet: <URL: http://www.hsbc.co.in/1/2/ALL_SITE_PAGES/HUB_PIB/PIB_TERMS_AND_CONDITIONS#pib 5>, 30 pages.
IBM Worklight application authenticity overview. IBM.com [online]. IBM Corporation [retrieved Feb. 6, 2015]. Retrieved from the Internet: <URL: http://www-01.ibm.com/support/knowledgecenter/SSZH4A_6.1.0/ com.ibm.worklight.dev.doc/dev/c_ibm_worklight_app_authentication_overview.html>, 3 pages.
International Search Report and Written Opinion for patent application PCT/US2016/025402 dated Jul. 18, 2016, 14 pages.
JPMorgan Access$^{SM}$ Security Features. Datasheet [online]. Copyright 2008 JPMorgan Chase & Co., Jun. 2008. Retrieved from the Internet: <URL: https://www.jpmorgan.com/cm/BlobServer?blobcol=urldata&blobtable=MungoBlobs&blobkey=id&blobwhere=1158520944481&blobheader=application%2Fpdf&blobnocache=true&blobheadername1=Content-disposition&blobheadervalue1=attachment;filename=FirstCash-C_JPMA_Sec_Features.pdf>, 2 pages.

Lee, Chern, 14.8 OpenSSH. FreeBSD Handbook [online]. Copyright 1995-2015 The FreeBSD Document Project [retrieved Feb. 4, 2015]. Retrieved from the Internet: <URL: https://www.freebsd.org/doc/handbook/openssh.html>, 7 pages.
New Security Token FAQs. maybank2u.com.sg [online]. Copyright 2015 Maybank, Malayan Banking Berhad, Sep. 4, 2014 [site visited Sep. 4, 2014]. Retrieved from the Internet: <URL: http://info.maybank2u.com.sg/eservices/personal/faq/faq-security-token.aspx>, 10 pages.
OTP c600 Secure Transaction Signing + OTP Mobile Token. Datasheet. rockey.com.my [online]. Softkey E-Solution SDN BHD [site visited Sep. 5, 2014]. Retrieved from the Internet: <URL: http://www.rockey.com.my/wordpress/one-time-password-authentication-token/otp-c600>, 2 pages.
Ricci, Antonio. 'Facing authentication threats: one time passwords and transaction signing.' Security Community Blog [online]. Copyright 2015 Symantec Corporation, Mar. 28, 2013 [site visited Sep. 4, 2014]. Retrieved from the Internet: <URL: http://www.symantec.com/connect/blogs/facing-authentication-threats-one-time-passwords-and-transaction-signing>, 4 pages.
SolidPass Frequently Asked Questions FAQ. solidpass.com [online]. SolidPass™ [site visited Sep. 4, 2014]. Retrieved from the Internet: <URL: http://www.solidpass.com/frequently-asked-questions-faq.html>, 3 pages.
YESsafe Mobile Token. Datasheet. i-sprint.com [online]. Copyright 2015 i-Sprint Innovations [site visited Sep. 4, 2014]. Retrieved from the Internet: <URL: http://www.i-sprint.com/wp-content/uploads/yessafe_token.pdf>, 2 pages.
Youll "Fraud Vulnerabilities in SiteKey Security at Bank of America," http://cr-labs.com/publications/SiteKey-28068718.pdf (Jul. 18, 2006), 16 pages.
"Designing a good security policy for your websites" http://programmergamer.blogspot.in/2013_04_01_archive.html(Apr. 29, 2013) 4 pages.
"Problems viewing or passing CAPTCHA verification" [site visited Jun. 19, 2015] https://help.yahoo.com/kb/SLN2662.html, 1 page.
"One Strong Authentication Solution for Every CA SSO Application" [site visited Jun. 19, 2015] http://www.idfconnect.com/products/sso-mobilekey/, 1 page.
"Show PHP Captcha on Failed Login Attempts" phppot.com http://phppot.com/php/show-php-captcha-on-failed-login-attempts/ (copyright 2008-2014), 6 pages.
Sani "Preventing Brute Force Login Attacks to the Citrix NetScaler Gateway/AAA-TM Login Pages" http://blogs.citrix.com/2012/02/01/preventing-brute-force-login-attacks-to-the-citrix-netscaler-access-gateway-or-aaa-for-tm-login-page-%E2%80%93-part-1/(Feb. 1, 2012), 6 pages.
"How to Configure a Separate Maximum Failure Counter and Threshold for OTP Authentication" [site visited Jun. 18, 2015] https://support.ca.com/cadocs/0/CA%20SiteMinder%2012%2052%20SP1-ENU/Bookshelf_Files/HTML/idocs/index.htm?toc.htm?1945685.html?intcmp=searchresultclick&resultnum=1805, 2 pages.
*McAfee One Time Password 3.5 Administration Guide* https://kc.mcafee.com/resources/sites/MCAFEE/content/live/PRODUCT_DOCUMENTATION/24000/PD24538/en_US/OTP_3_5_admin_guide.pdf (Copyright 2013)120 pages.
"Overload Protection" Paessler AG http://kb.paessler.com/en/topic/25523-what-is-overload-protection (Sep. 28, 2011), 9 pages.
U.S. Appl. No. 14/671,935, Final Office Action dated May 2, 2018, 6 pages.
U.S. Appl. No. 15/298,624, Non-Final Office Action dated May 31, 2018, 15 pages.
International Application No. PCT/US2016/058016, International Preliminary Report on Patentability dated May 3, 2018, 10 pages.
U.S. Appl. No. 14/920,807, Notice of Allowance dated Aug. 29, 2018, 7 pages.
U.S. Appl. No. 15/299,950, Notice of Allowance dated Aug. 30, 2018, 19 pages.

* cited by examiner

TECHNIQUES FOR AUTHENTICATION LEVEL STEP-DOWN

CROSS-REFERENCES TO RELATED APPLICATIONS

This application is a non-provisional application and claims the benefit and priority of U.S. Provisional Application No. 62/245,209, filed on Oct. 22, 2015, entitled "TECHNIQUES FOR USER AUTHENTICATION SESSION STEP DOWN," the content of which is herein incorporated by reference in its entirety for all purposes.

BACKGROUND

Generally, the present application relates to managing access to resources. More specifically, the application is related to techniques to change (e.g., reduce or lower) an authentication level of a session providing access to resources.

Modern businesses rely on a variety of protected resources (e.g., applications and systems that control and generate information) critical to business operations. Different applications often provide different services and information, and different users may require access to different levels of information within each system or application. As such, the level of access that users are granted to a protected resource may depend on a role of the user. For example, a manager may need access to certain information about employees that report to him, but it may be improper for that manager to access the same information about those whom he reports to.

Earlier less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular protected resource. Upon making a determination that access should be granted, a token is provided to the requestor. This token is like a key that can be used to open a door that guards restricted data. For example, a user may attempt to access a human resources database to gather information about certain employees such as salary information. The user's web browser makes a request to the application, which requires authentication. If the web browser does not have a token, the user is asked to log in to the access management system. When the user is authenticated, the user's browser receives a cookie that represents a token that may be used to access the human resources application.

In an enterprise, users (e.g., employees) typically may have access to one or more protected resources. A protected resource may utilize different access control policies and require different credentials (e.g., user names and passwords). A single sign-on session (SSO) system can provide a user with an authentication session enabling access to multiple protected resources after an initial, single authentication of a user. For example, when the user logs-in to their work computer, the user can then also have access to one or more other protected resources. An access management system may challenge a user to verify the user's identity to determine access to a resource. The user may be challenged for information based on a combination of "what you have," "what you know," and "who you are." The user may continue to access protected resources so long as the user successfully responds to the challenge, thereby maintaining a valid session for an SSO system.

Access management systems may employ various one or more authentication schemes to authenticate a user for access to a protected resource. An authentication scheme may implement an authentication mechanism to authenticate a user. Access to a protected resource may be controlled by one or more authentication schemes that are defined based on an authentication level for access to the protected resource. Access to some protected resources may be protected using multiple authentication schemes. For example, varying authentication levels may be defined for access to multiple protected resources. In some embodiments, one authentication level may enable a user to access protected resources defined for that authentication level and for resources defined for any authentication level lower that that authentication level, if one exists. Each authentication level may be associated with one or more authentication schemes. An authentication level may be determined based on the authentication schemes that have been applied. When a user is validated based on an authentication scheme, the user may be provided with an authentication session (e.g., an SSO authentication session) for the authentication level determined based on the authentication scheme.

Protected resources are configured to be accessed by a user that is provided with an authentication session based on an authentication level for accessing those protected resources. As such, a user must have an authentication session of a minimum authentication level for a protected resource for which the user is authenticated to access. When the authentication level is defined for multiple protected resources, a user may be automatically granted with access to those protected resources upon authentication of the user to access one of those protected resources at the authentication level. When a user accesses a protected resource defined by a higher authentication level, the access management system may challenge the user for extra credentials determined by the authentication scheme(s) defined for the higher authentication level. Upon validation of the user for a higher authentication level, the authentication session of the user may be increased (e.g., "stepped up") to gain access to the protected resourced at the higher authentication level. One or more other protected resources may be accessible at the higher authentication level. As such, the user can access the other protected resources at the higher level for the authentication session or any level lower than the higher authentication level.

Once the authentication session is adjusted to enable a user to access the higher authentication level, an access management system may provide a user with access to several protected resources at the higher authentication level. Access at the higher authentication level may be provided for the authentication session regardless of whether the user intends to access all of the protected resources at the higher authentication level. Access to all protected resources for the authentication session at the higher authentication level may pose a security threat for access to the protected resource. For example, any user that gains access to a client device having an authentication session at a higher authentication level may access all resources accessible at the higher authentication level. Such a scenario can happen in environment where a client device is public or shared by many users. For example, when a client device is left unattended, any user with access to the client device can then gain access resources at a higher level if the authentication session remains valid on the client device. To reduce these vulnerabilities with an authentication session at a higher authentication level, some have attempted to configure or modify access management systems to change the settings (e.g., timeout) of the authentication session to force a user to re-authenticate for the authentication session. Access management solutions may be challenged to provide users with the ability to adjust an authentication level such that it is reduced or lowered for an authentication session to limit access to less than what it was previously.

BRIEF SUMMARY

The present disclosure relates generally to managing access to resources. Specifically, techniques are disclosed to reduce, or "step-down" the authentication level of access to resources. A user may desire new and alternative mechanisms to adjust an authentication level for access to limit the number of resources accessible to a user during an active, valid session. For example, a user may desire to step-down (e.g., reduce or lower) an authentication level (e.g., an elevated authentication level) to a lower authentication level to limit access to resources accessible to the lower authentication level. An authentication level may provide access to a resource that is not accessible at the lower authentication level. The change in the authentication level may thereby limit access to resources otherwise accessible at an elevated authentication level to prevent or deny unauthorized access at the elevated authentication level.

Such techniques disclosed herein can reduce, if not prevent, unauthorized access to resources by an unauthorized user. In an access management system controlling access to many different resources, processing performance may be improved by reducing the number of communications for managing changes in access to resources at different levels. An access management system can voluntarily or involuntarily (e.g., by user action) adjust an authentication level of a session such that access to resources can be limited to those currently being accessed or desired for access by a user. By enabling a user to specify a lower level of authentication, security of an enterprise system and it resources may be protected from unauthorized users.

An access management system is configurable to reduce an authentication level for a session if a lesser authentication level exists. One or more resources accessible for the session at the elevated authentication level may not be accessible at the lesser authentication level. An access management system may be configured to adjust, or step-down, the authentication level of a session to prevent or deny access to resources at higher authentication levels (e.g., the authentication level). In another example, an access management system may configured to automatically step-down an authentication level of a session to prevent access to resources at a higher level corresponding to the authentication level before the step-down.

As explained above, once an authentication level for a session is raised to an authentication level above a lowest authentication level, a user may not be able to control the session to reduce that authentication level. Some access management solutions may try to limit access to a session by adjusting the authentication level until a condition for expiration of the session is satisfied or until some other event occurs that requires re-authentication of the user for the session. However, such solutions either incur time for the condition to occur or are burden the user to provide authentication credentials. Reauthentication further contributes to an increase in communications in a network for managing access. An enterprise system having thousands of users and resources may be impacted with reduced performance by the increase in communication for reauthentication to adjust a level of authentication.

Various techniques described in this disclosure enable improved management of a session. By reducing the authentication level to a lower authentication level, a user may be prompted to provide credentials for authentication according to the authentication schemes defined for higher authentication levels. These techniques can reduce, if not prevent, unauthorized access to protected resources by challenging a user for credentials to authenticate to higher authentication levels. In the context of a session providing single sign-on (SSO) functionality, the ability to control the authentication level enables the user to prevent unauthorized access to multiple protected resources accessible at a higher authentication level.

In a variety of scenarios, an access management system may increase an authentication level of a session for access to protected resources at a higher authentication level. The access management system may implement different or additional authentication schemes to change a current authentication level to a higher authentication level for a session. Upon successful authentication of a user at a higher authentication level, the user may be permitted access to protected resources only accessible at the higher authentication level. In the context of an SSO session, a user may be provided with access to several protected resources at an elevated, or higher authentication level based on authentication of the user to access one of those protected resources. For the period of a session, the user may remain authenticated at the higher authentication level, enabling access to protected resources accessible at the higher authentication level. In this scenario, a user may desire to step-down the higher authentication level.

In at least one embodiment, the access management system may provide one or more mechanisms enabling a step-down of a current authentication level to a lower authentication level if one exists. Upon determining that one or more authentication levels are defined as lower than the current authentication level for a session, the access management system may implement a mechanism to reduce a current authentication level to a lower authentication level. An authentication level may be reduced after determining that a user may not need access to a protected resource at that authentication level. Such a determination may be made based on an implicit acknowledgement by a user. The implicit acknowledge may be communicated as a request to reduce the current authentication level.

In some embodiments, a session may be configured to reduce (e.g., step-down) a current authentication level based on satisfaction of one or more conditions. The condition(s) to reduce an authentication level may be configurable by a user. The conditions may be specific based on a variety of criteria, including a types of resource, the user accessing a resource, time, or other events in an enterprise system. The access management system may store data with session information for a session. The data may be stored to indicate the conditions for reducing an authentication level, to indicate when an authentication level has been reduced, to indicate a current authentication level after reduction from a higher authentication level, or a combination thereof.

In at least one embodiment, an access management system may enable a user to voluntarily request a step-down of a current authentication level of a session. A user may operate a client device at which a session is provided to the user to request the access management system to reduce a current authentication level or to provide a mechanism by which the user can make such a request. For example, the access management system may send data (e.g., a uniform resource location (URL)) to a client device as a mechanism to initiate a request to adjust an authentication level from the client device. The client device may provide an interface to present the data to enable a user to adjust an authentication level at the client device. The client device may display a resource accessed using the data. The resource may provide an interactive element to request the current authentication level to be reduced. In some embodiments, the URL may be sent to the client device based on a condition configured for the session. The resource provided at the URL may enable a user to invoke a request to reduce the authentication level. The user may be able to request the authentication level to be reduced for the session, if a lower authentication level exists. The authentication level may be reduced to a previous authentication level of the session before the current authentication level was activated.

In at least one embodiment, an access management system may involuntarily (e.g., automatically) request a step-down of a current authentication level of a session. The access management system may be configured based on one or more conditions to step-down an authentication level, if a lower authentication level exists, for a session. The conditions may be defined based on resources and/or other events related to the access management system. The conditions may be configured based on input from a user. For example, a user may indicate to step-down an authentication level upon completion of authentication to establish a session.

Upon reducing an authentication level, the access management system may enable user to access only those resources at the reduced authentication level. To access resources at an authentication level higher than the reduce authentication level, the access management system may then request the user to authenticate for the higher authentication level.

In some embodiments, an access management system may include a computer system that is configured to implement methods and operations disclosed herein. A computer system may include one or more processors and one or more memory accessible to the one or more processors and storing one or more instructions which, upon execution by the one or more processors, causes the one or more processors to implement methods and/or operations disclosed herein. Yet other embodiments relate to systems and machine-readable tangible storage media which employ or store instructions for methods and operations disclosed herein.

In some embodiments, a method includes identifying a first authentication level at which access to a resource is permitted. The resource may be provided by a resource computer system. The first authentication level may be different from a second authentication level at which the resource is not accessible. The method may include, in response to receiving a request to access the resource from a computing device by a user, determining, authentication of a user at the first authentication level. The method may include, based on determining that the user is authenticated for the computing device at the first authentication level, establishing a session at an authentication level for the computing device. The authentication level of the session may be the first authentication level that enables the user at the computing device to access the resource provided by the resource computer system. The method may include detecting an event based on which to prevent the resource from being accessed by the user at the computing device for the session at the first authentication level. The access to the resource by the user at the computing device may be prevented by modifying the authentication level of the session to the second authentication level. The method may include, based on the detecting of the event for which to prevent the access to the resource at the first authentication level, modifying the authentication level of the session from the first authentication level to the second authentication level at which the resource is not accessible by the user at the computing device.

In some embodiments, the request is a first request. The method may include, after the session is established at the first authentication level, receiving, from the computing device, a second request to prevent the access to the resource at the first authentication level. Receiving the second request may be detected as the event. The method may include sending, to the computing device, access data that indicates a location of a web page. The web page may include one or more interactive elements to request a change in the authentication level of the session. The second request may be received in response to interaction with the web page to request a first change in the authentication level from the first authentication level to the second authentication level.

In some embodiments, the method may include, after the session is established at the first authentication level, receiving a request to access one or more resources, where the one or more resources are accessible by the computing device at the second authentication level, and where the request to access the one or more resources is detected as the event. The method may include enabling the computing device to access the one or more resources based on determining that the session is active and that the authentication level of the session is at the first authentication level.

In some embodiments, the request is a first request and the resource is a first resource. The method may include, after the session is established at the first authentication level, receiving a second request to access a second resource that is different from the first resource. The method may include determining that the second resource is accessible by the computing device at the second authentication level, where the second request is detected as the event based on determining that the second resource is accessible at the second authentication level.

In some embodiments, an event can be an expiration of a time period during which the session is active at the authentication level.

In some embodiments, the method may include sending, to the computing device, a request for credential information of the user to access one or more resources at the first authentication level. The method may include receiving, from the computing device, the credential information. The method may include determining the authentication of a user at the first authentication level based on verifying that the credential information.

In some embodiments, the method may include determining that the authentication of the user at the first authentication level is based on a first authentication process of the first authentication level and a second authentication process of the second authentication level. The method may include in response to receiving the request, determining that the session is an active session previously being established at the second authentication level based on a second authentication of the user for the second authentication process. The method may include sending, to the computing device, a request for credential information of the user for the first authentication process. The method may include based on receiving the credential information of the user for the first authentication process, determining a first authentication of the user for the first authentication process. The authentication of the first at the first authentication level may be based on the first authentication of the user and the second authentication of the user previously determined for the active session. The session may be established at the authentication level for the first authentication level based on the active session. The active session may be modified from the second authentication level to the first authentication level for establishing the session.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

Figure 1:
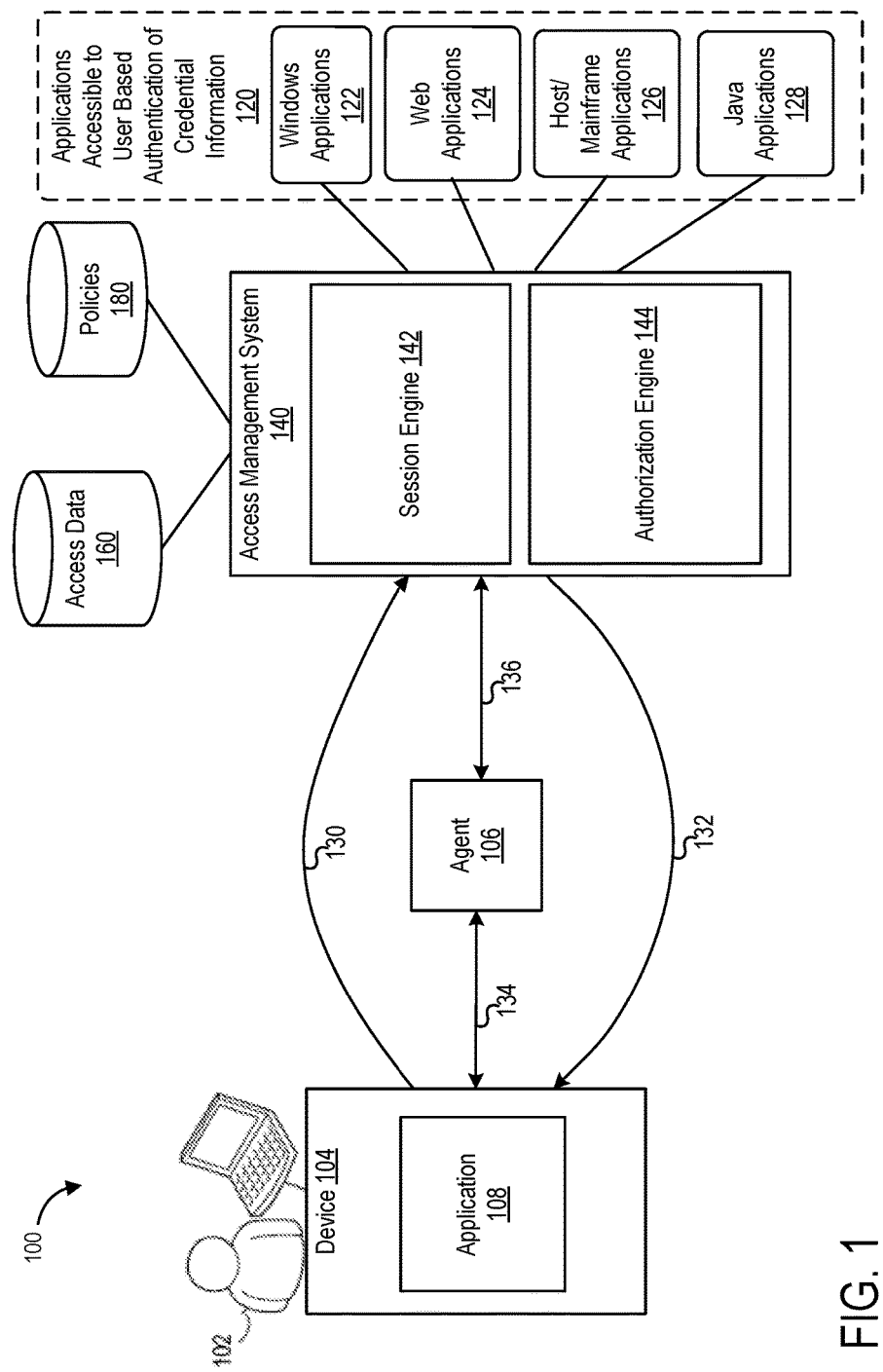
FIG. 1 illustrates a high-level diagram of a system for managing authentication levels for access to resources, in accordance with an embodiment.

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to techniques for providing single sign-on (SSO) access to one or more resources. A session, or an access session, may provide a user with access to one or more resource computer systems after an initial verification of (e.g., authentication) credential information (e.g., a username and a password). A resource computer system may provide access to one or more resources. A resource may be identified by a uniform resource locator (URL), uniform resource identifier (URI), or other data indicating a source of the resource.

Certain techniques are disclosed to enable an access management system to reduce, or "step-down" the authentication level of the session providing access to resources. An access management system is configurable to enable voluntary (e.g., request by a user) or involuntary (e.g., by the access management system) reduce the authentication level for a session if a reduced authentication level exists.

Once an authentication level for a session is raised to a higher authentication level to provide access to protected resources, an access management system may be unable to reduce that authentication level for a session. Some access management solutions may try to limit access by a session by adjusting the authentication level until a condition for expiration of the session is satisfied or until some other event occurs that requires re-authentication of the user for the session. Some access management systems may terminate a session or revoke access to modify (e.g., reduce or lower) authentication in order to minimize access to resources. Various techniques described in this disclosure enable improved management of a session enabling access to resources.

By reducing the authentication level to a lower authentication level, access to resources at a level requiring additional authentication (e.g., higher authentication level) may demand further authentication or re-authentication. For example, once an authentication level is changed to a level that requires less authentication, a user may be prompted to provide credentials for authentication according to the authentication schemes defined for higher authentication levels to access resources previously accessible at the higher authentication level before reducing the authentication level. These techniques can reduce, if not prevent or deny, unauthorized access to protected resources by challenging a user for credentials to authenticate to higher authentication levels. In the context of a session providing SSO functionality, the ability to control the authentication level may prevent unauthorized access to multiple protected resources accessible at an authentication level requiring additional authentication for the protected resources.

In at least one embodiment, an access management system may provide one or more mechanisms enabling a step-down of a current authentication level to a lower authentication level if one exists. Upon determining that one or more authentication levels are defined as lower than the current authentication level for a session, the access management system may implement a mechanism to reduce a current authentication level to a lower authentication level. An authentication level may be reduced after determining that a user may not need access to a protected resource at the current, higher authentication level. Such a determination may be made based on an implicit acknowledge by a user. The implicit acknowledge may be communicated as a request to reduce the current authentication level. In some embodiments, a session may be configured to reduce a current authentication level based on one or more conditions. The condition(s) to reduce an authentication level may be configurable by a user. The access management system may store data with session information for a session to indicate the conditions for reducing an authentication level, to indicate when an authentication level has been reduced, and to indicate a current authentication level after reduction from a higher authentication level.

Techniques (e.g., systems, methods, and machine-readable media) are disclosed for adjusting the authentication level of access to a resource through a session. FIG. 1 illustrates a system 100 in which access to resources in a session can be modified such that the authentication level of the session can be reduced. It may be desirable to adjust an authentication level of a session to a lower level so as to prevent unauthorized access to resources otherwise accessible at a higher authentication level.

For purposes of illustration, "session" as described herein includes a session, or an access session, which provides a user with access to one or more resources. Sessions disclosed herein may be referred to, for example, as an SSO session, an authentication session, or any other type of session that provides access to a user. Any type of session described herein is intended as a session providing access to one or more resources. A session may include other types of sessions enabling access to a user. Access management system 140 may provide access one or more resources. Access management system 140 may implement a sign-on system, e.g., a SSO system, which enables a session to provide SSO access to one or more resources.

Resources may include, without restriction, a file, a web page, electronic content, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be stored and/or managed by one or more computer systems, e.g., a resource computer system. A resource computer system may facilitate or control access to one or more resources upon authentication of a user. A session, such as a SSO session, may enable a user to access resources based on authentication of a user a single time.

User 102 operating a device (e.g., device 104), may present one or more interfaces (e.g., a graphical interface or a physical interface) that accept input to enable a user to interact with an access management system (e.g., access management system 140). Device 104 may be a client device. Examples of device 104 include, without restriction, a workstation, personal computer (PC), laptop computer, smart phone, wearable computer, or other networked electronic device. An interface presented at device 104 may be accessible using an application, e.g., application 108, executing on device 104. Some embodiments disclosed herein may be implemented by one or more communications 130 from device 104 to access management system 140, and one or more communications 132 from access management system 140 to device 104. Client devices and access management system 140 may communicate via one or more communication networks. Examples of communication networks may include a mobile network, a wireless network, a cellular network, a local area network (LAN), a wide area network (WAN), other wireless communication networks, or combinations thereof.

In at least one embodiment, user 102 may request access management system to adjust (e.g., reduce) an authentication level of a session. Device 104 may provide an interface via application 108 to enable user 102 to adjust an authentication level. In some embodiments, an authentication level of a session may be reduced by a user at a different device than the one in which the session was created for the user. User 102 may request the authentication level of a session to be reduced. Upon receiving a request from user 102 to modify (e.g., reduce) the authentication level of a session, access management system 140 may initiate a process by which access management system 140 may change the authentication level of a session.

In some embodiments, access management system 140 may be configured to automatically modify the authentication level of a session upon detecting an event. Such action may be involuntary; however, the event may be configurable by a user. The event may be voluntary such that it is driven by user 102 requesting the authentication level to be reduced or the event may be involuntary such that it is not driven by a user. Access management system 140 may operate in an involuntary manner such that it may modify the authentication level based on satisfaction of one or more criteria that define an event. For example, an event may be defined as a request to access a resource, which is accessible at authentication level that is different (e.g., lower) than a current authentication level.

Access management system 140 may be implemented by a computer system. The computer system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof. Access management system 140 may be implemented as an Oracle Access Manager (OAM), provided by Oracle® corporation.

In some embodiments, access management system 140 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include session engine 142 and authorization engine 144, each of which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on one or more processors, cause the one or more processors to perform the operations disclosed herein.

FIG. 1 shows an example in which user 102 can engage in communication with access management system 140 to modify an authentication level. In this example, user 102 operating device 104 may attempt to access a resource such as an application 108, e.g., any one of applications 120 or the resources accessible through applications 120. One or more of applications 120 may be accessible to user 102 upon successful authentication of credential information for user 102. Access to an application may be based on an authentication level for which user 102 authenticates. Access to resources, such as applications 120, may be controlled by varying authentication schemes based on an authentication level for controlling access to each of the resources.

To enable one of applications 120 to be accessed by user 102 at device 104, user 102 may be requested to authenticate to establish a session (e.g., a SSO session) that provides user 102 with access to the applications 120. Device 104 may initiate an authentication process by requesting access from access management system 140. The authentication process may include device 104 displaying one or more GUIs to receive credential information of a user and submitting a request for authentication to access management system 140. Authentication may be established based on verifying user's 102 credential information for authentication defined for the resource which is requested for access.

In attempting to access an application, user 102 may operate an application (e.g., application 108) that manages access to a user's account via access management system 140. For example, application 108 is an access management application that may present GUIs. Using application 108, user 102 may request access to one or more resources, engage in authentication, and request modification of an authentication level.

Communications between device 104 and access management system 140 can be received through a gateway system. The gateway system may support access management services. For example, a single sign-on (SSO) gateway may implement one or more access agents, such as agent 106 (e.g., web gate agent), to balance and/or handle requests from clients and access management system 140. Device 104 may send/receive one or more communications 134 to/from agent 106 to facilitate access by device 104 to one or more resources. Access management system 140 may send/receive one or more communications 136 to/from agent 106 to facilitate access by device 104 to one or more resources.

Resources (e.g., applications 120) may be accessible to user 102 based on successful authentication of credential information. Upon receiving the credential information, session engine 142 may verify whether a requested resource, e.g., application 108, is a protected resource that requires credentials for access. Session engine 142 may request authorization engine 144 to determine whether access to a resource is protected. Upon determining that access determines that the resource is not protected, session engine 142 may grant access to a resource. Upon determining that access to a resource is protected, session engine 142 may determine authentication of user 102 based on the credential information. Specifically, session engine 142 may verify whether the credential information matches credential information registered for enabling user 102 to access the resource.

Upon determining authentication of user 102, authorization engine 144 may determine whether user 102 is authorized to access a resource based on access permitted to user 102. Session engine 142 may send a communication to device 104 to indicate an authorization of the user as to whether user 102 is permitted to access the resource. Application 108 may be enabled as a resource accessible to user 102 upon determining that user 102 is authorized to access the resource.

Access management system 140 may provide many access management services including management of access (e.g., granting/denying access) to resources, automatic sign-on, application password change and reset, SSO management, session management, application credential provisioning, as well as authentication of a session. In some embodiments, access management system 140 can provide automatic SSO functionality for applications 120, such as Windows® applications, Web application, Java® applications, and mainframe/terminal-based applications running or being accessed from client devices. As explained above, access management system 120 may perform authentication of a user (e.g., user 102) operating a client device (e.g., device 104). Authentication is a process by which a user verified to determine that he/she is who he/she claims to be.

In some embodiments, access management system 140 may use one or more policies stored in a data store 180 ("policies") to control access to resources. Policies 180 may include an authentication policy that specifies the authentication methodology to be used for authenticating the user for whom the access must be provided on a given resource. Policies 180 define the way in which the resource access is to be protected (e.g., type of encryption, or the like). Policies 180 may include an authorization policy that specifies the conditions under which a user or group of users has access to a resource. For example, an administrator may only authorize certain users within a group to access particular resources. Access management system 140 may determine authentication for a session based on one or more of policies 180.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as access data 160 and policies 180. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session engine 142 may handle processing to determine whether a valid session exists for user 102 to access a resource that is protected. Access to a protected resource may be controlled based on authentication, or verification of credential information, of a user. Access management system 140 may store data in access data 160 related to managing access to resources. For example, access data 160 may include session information for a session established to access one or more resources and data about authentication of a user for the session. The data about authentication may indicate an authentication level at which the user is authenticated and the resources for which the user is authorized to access at the authentication level. In some embodiments, the data about authentication may indicate resources for which the user is authorized to access at any authentication level less than, or below, the authentication level for which the user is authentication.

Session engine 142 can check for a valid session for user 102 to access a requested resource that is protected. Session engine 142 may assess validity of a session for user 102 based on consideration of one or more access policies applicable to user 102. Session engine 142 may query access data 160 to determine whether session information is stored for a user, and whether the session information indicates that a session is valid. Session engine 142 may assess the access data to determine whether authentication of a user for the session permits the user with authorization to access a requested resource. Based on determining that a valid session does not exist for user 102, session engine 102 may request 108 credential information ("credentials") from user 102. Successful authentication of the credential information may provide the user with access to one or more resources, which may include a requested resource.

Request 108 may be communicated to device 104, which in response, prompts user 102 for user credentials to determine authentication of a session. Request may include information (e.g., a URL) to a web page or a user interface (e.g., a web page, portal, or dashboard) to receive credential information. Request 108 may be communicated to device 104, which in response, prompts user 102 for user credentials to determine authentication of a session.

Session engine 142 may perform operations to authenticate credential information for user 102. In some embodiments, session engine 142 may store information about sessions established upon successful authentication of a user. For example, session engine 142 may store session information in access data 160 about a session established as a SSO session using SSO techniques. The session information may include access information for enabling SSO access to multiple resources accessible to user based upon successful authentication of credential information for a user.

In some embodiments, session engine 142 may communicate with authorization engine 144 regarding the scope of authentication. Session engine 142 can send the scope information received from device 104 to authorization engine 144. Authorization engine 210 can determine resources that are protected and based on authentication sessions 150, can determine resources that are permitted and/or restricted for a session.

In some embodiments, access management system 140 may be implemented in system 100 according to an agent-server model for communication between device 104 and any one of access manager servers implemented for access management system 140. The agent-server model may include an agent component (e.g., a gateway system) and a server component. The agent component may be deployed on a host system and the server component may be deployed on a server, e.g., an access manager server, implementing using a server computer. User 102 operating device 104 may communicate with access management system 140 via agent 106 using an enterprise computer network.

Agent 106 may provide access control and may operate to protect access management system 140 and any resources accessible through access management system 140 against external and internal web-based threats. Access management system 140 may communicate with one or more resource computer systems (e.g., resource servers) that provide access to one or more resources, e.g., applications 120. A resource computer system may be managed by a party not associated with access management system 140. For example, a resource computer system may be a third-party service provider that provides access to resources, such as email. Agent 106 may implement or operate as an agent component for access management system 140 and may include a computer system that operates as a server component for access management system 140.

Each resource accessible by access management system 140 may be protected through an agent, e.g., agent 106. Agent 106 may intercept user requests for one or more resources protected by it and verify authentication of the user(s). The agent may contact access management system 140 to verify whether a resource is a protected resource for which access is controlled by authentication. If the access management system 140 determines that the resource is not protected, agent 106 may grant access to user 102. If the resource is protected, agent 106 may request user 102 to provide authentication credential information.

In some embodiments, communication 136 between agent 106 and access management system 140 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 140. Each channel may communicate using an access token designed for the type of communication over the channel. The access flow may generate two types of browser tokens. A first token is an access management ID token (e.g., OAM_ID token), which serves the SSO requests that are being propagated over HTTP. A second token is an authorization token (e.g., OAM Authn Token) that may be used to server the SSO requests that are being propagated over OAP. The browser tokens may be stored as host cookies at device 104.

Access management system 140 (e.g., using agent 106) may request user 102 for authentication credentials in the form of a challenge (e.g., via the user's web browser at device 104). In some embodiments, user 102 can access an interface through a client (e.g., application 108) executing on device 104 or through a web browser on device 104. The interface may be implemented at access management system 140. Access management system 140 may send, with request 108, the interface or information (e.g., a URL) enabling access to the interface.

In some embodiments, an interface can include a list of the applications user 102 commonly utilizes. User 102 can manage their credentials and policies associated with applications through the interface. When user 102 requests to access an application, e.g., application 108, through the interface, a request may be sent from device 104 to access management system 140 to determine a policy type for the application from one or more policies applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent 106 can enable users to access any of applications 120 using services provided by access management system 140. Access may be provided through a web browser directly, without first accessing the interface or using a client executing on device 104. If user 102 is not authorized, then access management system may request 108 credentials from user 102. The interface may receive input including credential information. The credential information may be sent to access management system 140 to determine authentication of user 102.

In some embodiments, credential types can be supported, such as protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For protected resources, user requests can be authenticated and then directed to URLs associated with the requested resources. For federated applications, links to federated partners and resources can be provided, including business to business (B2B) partner applications and SaaS applications. For form fill applications, templates can be used to identify fields of application web pages through which credentials can be submitted.

Access management system 140 can automatically, or based on input from a user, modify an authentication level of a session. One or more policies may be defined to indicate when to modify the authentication level. A policy may be defined for modification of authentication level based on a resource, a time period, a specific user, or other criteria related to a session. The following sequence of operations in FIGS. 2 and 3 illustrate various exemplary embodiments by which access management system 140 can modify (e.g., lower) an authentication level of a session.

In some embodiments, such as those described with reference to FIGS. 2 and 3, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function. The processes depicted herein, such as those described with reference to FIGS. 2 and 3, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., access management system 140 of FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing depicted in FIGS. 2 and 3 may be described with respect to accessing a single resource, such processing may be performed for multiple resources, such that an authentication level of a session may be modified for multiple resources, or resources individually. Processing depicted in FIGS. 2 and 3 may be described with respect to multiple sessions, each for which an authentication level may be modified. Furthermore, additional steps may be added or removed depending on the particular applications. One of ordinary skill in the art would recognize many variations, modifications, and alternatives.

Figure 2:
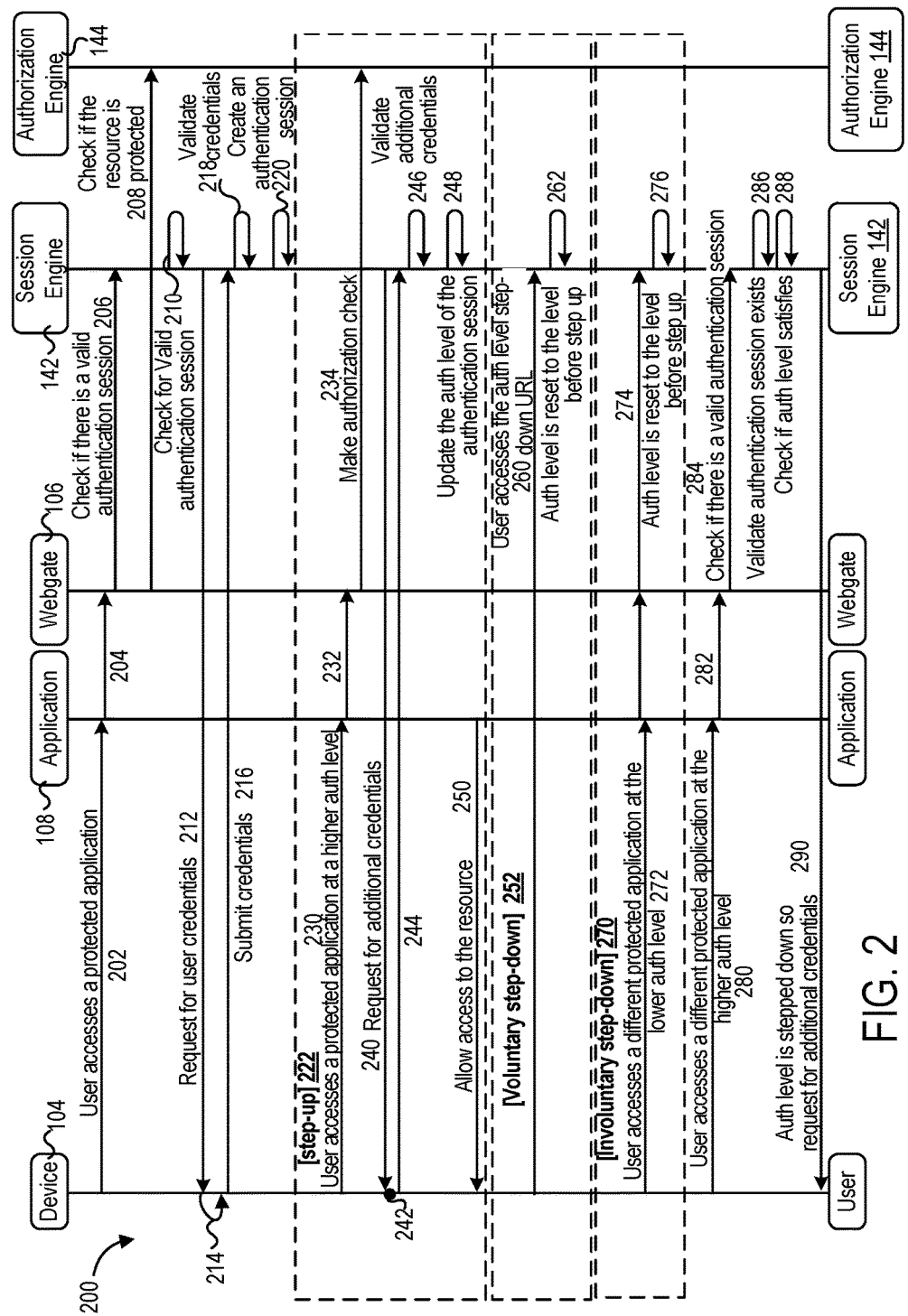
FIG. 2 illustrates a sequence diagram of a process for managing an authentication level of access to a resource, in accordance with an embodiment.
Figure 3:
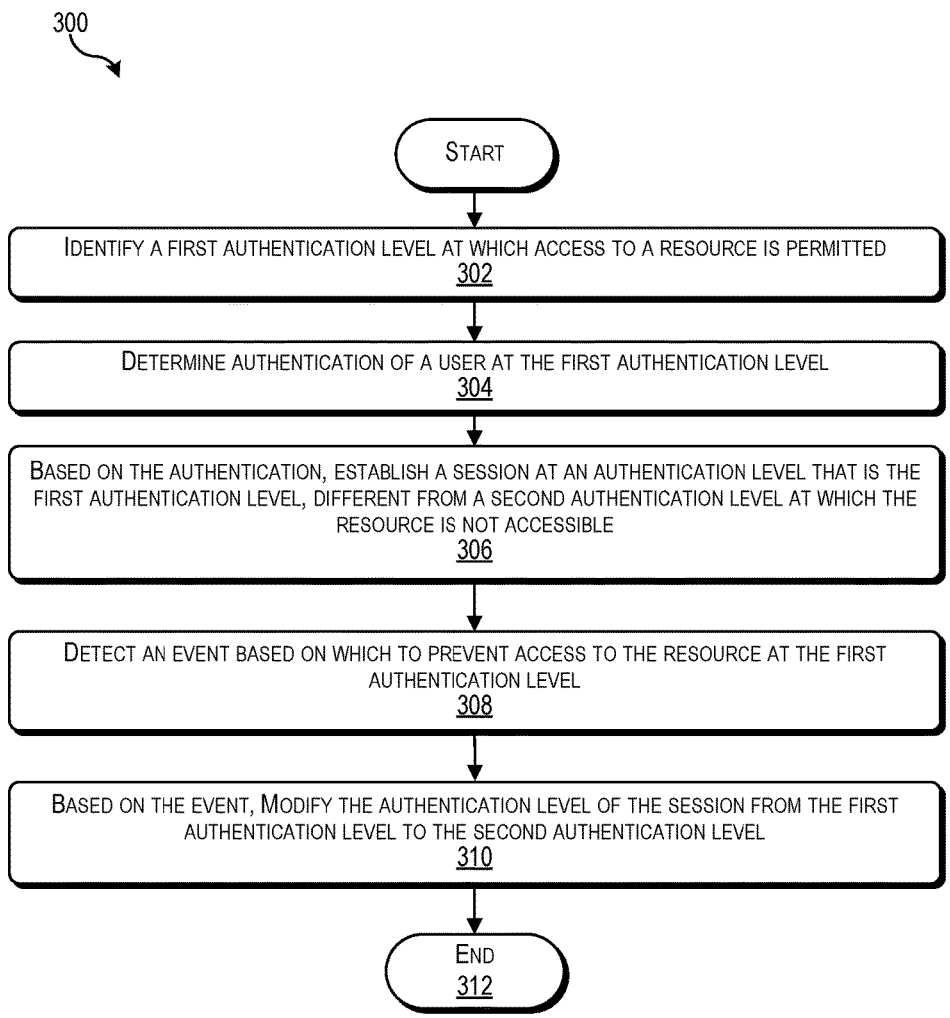
FIG. 3 illustrates a flowchart of a process for adjusting an authentication level of access to a resource, in accordance with an embodiment.

In an aspect of some embodiments, each process in FIGS. 2 and 3 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

FIG. 2 illustrates a sequence diagram 200 showing operations for modifying an authentication level of a session, in accordance with an embodiment.

Starting at step 202, a user 102 operates device 104 to request a resource ("requested resource") for which access is managed by an access management system, e.g., access management system 140. As explained above, a resource may be an application or a resource accessible using an application, e.g., application 108. In the example of FIG. 2, user 102 may request access to application 108 ("user accesses a protected application"). Application 108 may be protected such that user 102 has to provide credential information to gain access to application 108.

Requests to access a resource may be handled by an agent, e.g., a Web Gate 106. An agent may protect access to a resource provided by a server. Web Gate 106 may communicate with one or more agent endpoints. For example, Web Gate 106 may communicate with a session engine 142 ("SSOEngine 142") of access management system 140 to perform authentication for user 102 on device 104 to establish a session for user 102. Web Gate 106 may communicate with an authorization engine 144 ("AuthzEngine") of access management system 140 to perform authorization for access to a resource.

Authorization engine 144 may control authorization to access one or more resources. Authorization engine 144 may determine whether authentication is necessary to access a resource, and if so, what credential information is needed based on an authentication level to access a resource. Resources may be associated with one or more authentication levels, each having different access requirements. A resource accessible at a lower authentication level may be accessible by any higher, or elevated, authentication level that demands additional credential information. Authentication for a higher authentication level may include step-up authentication whereby a user must provide additional credential information to gain access to resources at the higher authentication level.

Web Gate 106 may intercept user requests for one or more resources protected by it to determine access to a requested resource. Web Gate 106 may check for user credentials in order to authenticate user 102 for a session to access to those resources controlled by the access management system. Web Gate 106 may request authorization engine 144 to determine whether access to a requested resource is protected, and if so, what credentials is needed to determine authentication to access the requested resource.

At step 204, Web Gate 106 may intercept a request for access to a resource. Web Gate 106 may determine whether the resource is protected and if so, whether an active session exists to enable access to the resource from device 104 via application 204. Upon successful authentication of a user, a session (e.g., an authentication session) may be established for the user at a client. In some embodiments, the session may be established as an SSO session enabling access to multiple resources at the authentication level a user is authenticated for. The requested resource is accessible at the authentication level.

At step 206, Web Gate 106 may determine whether a session is active to access a requested resource (e.g., check if there is a valid authentication session). For example, Web Gate 106 may determine that a session is active to provide access to resources including the requested resource. In some embodiments, Web Gate 106 may determine whether a requested resource is protected, such that authentication is required to access the resource and that minimum level of authentication is needed to access the resource. If authentication is required, then Web Gate 106 may determine whether a session is active and if not, proceeds to determine authentication of user 102 to access the requested resource.

In at least one embodiment, at step 208, Web Gate 106 may determine whether a requested resource is protected ("check if the resource is protected"). Web Gate 106 may communicate with authorization engine 144 to determine whether a resource is protected, and if so the authentication levels for which the resource may be accessed. In some instances, a resource may be protected for some users and may not be protected for other users depending on access granted to each user at an authentication level. Criteria for authentication of user 102 may be determined based on the authentication level. For example, one or more access policies may be accessed to determine authentication of user 102 to access the requested resource.

At step 210, session engine 142 may determine whether user 102 has a valid session, e.g., checking whether a valid authentication session is required to proceed. Upon determining that user 102 does not have a valid session for a resource, at step 212, session engine 142 may send a request for user credential information ("user credentials") of user 102. Credential information may be requested for a minimum authentication level that enables access to the requested resource. Successful authentication of the credential information may provide the user with access to one or more resources, which may include the requested resource.

A request at step 212 may be communicated to user 102 at device 104, which in response, device 104 prompts user 102 for user credentials to determine authentication of a session. The request may include information (e.g., a URL) to a web page provided by session engine 142 to obtain credential information. The web page may be displayed in application 108 or some other interface at device 104. In some embodiments, the request may include resource information identifying one or more resources accessible to user 102 for a session upon successful authentication of the credential information.

At 214, device 104 may display an interface (e.g., a web page or an interface within an application) to challenge user 102 for credential information. At step 216, device 104 may send the input (e.g., submit credentials) received to session engine 142. The input may include credential information ("credentials").

At step 218, session engine 142 may perform operations to authenticate credential information (e.g., validate credentials) for user 102. At step 220, operations may be performed by session engine 142 to establish a session (e.g., create an authentication session) based upon successful authentication of user 102 using the credential information. The session may be an SSO session. User 102 may be provided with access to the requested resource upon creation of the session.

In some embodiments, access management system 140 may perform a process 222 ("Step-up") to adjust (e.g., "step-up") the authentication level of a session such that additional authentication is performed before access is permitted to one or more resources. For example, at step 230, user 102 may operate device 104 to request access to a resource that is accessible based on authentication at an authentication level that higher, or elevated compared to the authentication level at which user 102 authenticated in the previous steps. At step 232, Web Gate 106 may intercept the request to access the resource at the higher authentication level. At step 234, Web Gate 106 may request access from session engine 142, which may include determining authorization to access the resource based on previous authentication of user 102. As such, authorization engine 144 may be requested to determine authorization to access the resource based on the authentication level for which user 102 is authenticated. Upon determining that the authentication level does not enable access to the resource, at step 240, session engine 142 may send a request to device 104 for additional credential information from user 102 as part of step-up authentication to access a resource at a higher authentication level. At step 242, user 102 may be requested by device 104 for input of additional credential information ("additional credentials") to device 104. At step 244, device 104 may send the input (e.g., additional credential information) to session engine 142 to perform authentication of user 102 for the higher authentication level. At step 246, session engine 142 may determine authentication of user 102 (e.g., validate additional credentials) at the higher authentication level based on the additional credential information. The authentication level of the session may be modified to the higher authentication level at step 248. Session engine 142 may inform device 104 directly or indirectly through Web Gate 106 that access to the requested resource at step 230 is permitted based on authentication at a higher authentication level. At step 250, access to the requested resource may be allowed at device 104 through application 108 for the higher authentication level.

As discussed earlier, authentication at a higher authentication level may enable access to multiple resources including a resource that is requested. As such, user 102 operating device 104 may have access to multiple resources at the higher authentication level. If device 104 is not in the control of user 102, a different user operating device 104 may have access to the resources at the higher authentication level. For example, a user sharing device 104 with user 102 may obtain access to resources at a higher authentication level that user 102 does not want the user to access. User 102 may desire for options to step-down authentication of the higher authentication level if lower authentication levels exist.

Access management system 140 may monitor events in the system to determine whether any event warrants a step-down in a current authentication level of a session for user 102. Events may include a request for a user, satisfaction of one or more criteria for step-down authentication, or a combination thereof. Criteria may include a time period, a request for accessing a resource that is accessible at a lower authentication level, or other conditions related to authentication. Upon detecting an event, session engine 142 may modify an authentication level to step-down to a lower authentication level. Access data 160 may be modified to store information about the authentication level, the detected event, and any other information for managing or adjusting an authentication level.

In certain embodiments, a process 252 ("involuntary step-down") may enable user 102 to voluntarily step-down authentication from a higher level to a lower level of authentication. An event may be defined as voluntary step-down that occurs based on voluntary action by the user. Access management system 140 may provide user 102 with an interface to request step-down of an authentication level. For example, application 108 may provide an interface that enables a user to initiate a request to reduce, or step-down an authentication level of a session. The device 104 may expose or present a view (e.g., a web page) of a URL that enables a user to provide input to initiate a request to session engine 142 to step-down authentication. At step 260, user 102 may provide input to the web page at device 104 to request to step-down authentication to reduce an authentication level from a higher level in the step-up authentication initiated at step 230 to a lower authentication level.

At step 262, session engine 142 may determine whether a session exists for user 102, and if so, whether a current authentication level can be modified ("stepped down") to a lower authentication level, if any. Session engine 142 may modify the authentication level for the session from a higher authentication level to a lower authentication level. For example, session engine 142 may reset the authentication level to an authentication level before step-up of an authentication level at step 230. At step 262, session engine 142 can detect an event, such as a request to step-down the authentication level, to initiate step-down of the authentication level.

In some embodiments, user 102 may be presented with options to select a lower level if any at all. The options may be presented in an interface at device 104, such as in application 108. By default, the authentication level may be stepped down to the previous lower authentication level. At the lower authentication level, access to resources at the higher authentication level will not be accessible until user 102 provides additional credential information. Session engine 142 may communicate information that access to resources has changed to a lower authentication level. The information may be communicated to Web Gate 106, or the application 108.

In some embodiments, a process 270 ("involuntary step-down") may enable a higher authentication level to be modified to a lower authentication level without user's 102 input. For example, involuntary step-down may be configured based on one or more criteria, such as a time period, a request to access a particular resources, or any event related to an access management system. Involuntary step-down may be configured for specific resources and may be configured different for users. Involuntary step-down may be configured different for different authentication levels.

In the example of FIG. 2, process 270 may be initiated by user 102 performing an action at device 104 that initiates a request for involuntary step-down in the authentication level of an existing session. For example, user 102 may request access to a resource that is accessible at a lower authentication level that a current authentication level for an active session. The request from user 102 may be made through application 108.

At step 272, the request may be intercepted by Web Gate 106. At step 274, Web Gate 106 may request session engine 142 to step-down authentication of the authentication level of an active session for user 102. In some embodiments, Web gate 106 may pass the request to session engine 142.

At step 276, session engine 142 may determine detect an event that causes session engine 142 to reduce an authentication level of a session. For example, session engine 142 may reduce, or downgrade an authentication level involuntarily based on a request for a resource at a lower authentication level. Session engine 142 may determine modification of an authentication level based on a policy.

In both of the voluntary step-down process 252 and the involuntary step-down process 270, session engine 142 may send communications to a client device to indicate a status of authentication (e.g., when an authentication level has been modified). Session engine 142 may send information to Web Gate 106 and/or application 108 to indicate access to a requested resource and/or to indicate that an authentication level has changed.

Once an authentication level has been reduced, user 102 may request at device 104 access to a resource at a higher authentication level at step 280. At step 282, Web gate 106 may intercept a request for the resource. At step 284, Web Gate 106 may request session engine 142 to determine whether user 102 is authenticated to access the resource at the current authentication level. At step 286, session engine 142 may determine whether a session exists for the user. At step 288, session engine 142 may determine the authentication level for the authentication session. If the authentication level does not permit access to a resource, then session engine 142, at step 290, may request device 104 to prompt user 102 to provide credential for step-up authentication to modify the authentication level to one which enables access to the resource.

FIG. 3 illustrates a process 300 for adjusting an authentication level of access to a resource, in accordance with an embodiment. Process 300 may be implemented by access management system 140 of FIG. 1.

Process 300 may begin at step 302 by identifying an authentication level (e.g., a first authentication level) at which access to a resource is permitted. Resources may be provided by a resource computer system. A resource may be an application. A resource can be data (e.g., a URL or a URI) accessed through an application.

A first authentication level may be different from another authentication level (e.g., a second authentication level) at which the resource is not accessible. Different resources may be accessible at different authentication levels. Authentication levels may each have a different authentication scheme or process. Each authentication process may include one or more authentication steps, all or some of which may be different from an authentication process of a different authentication level. Access to resources may be defined in an access policy. An access policy can indicate authentication levels, and the corresponding authentication schemes or processes for each of those authentication levels.

At step 304, authentication of a user at the first authentication level may be determine. The authentication of the user may be determined in response to receiving a request to access the resource from a computing device by the user. The authentication may be determined based on an authentication process for the first authentication level. The first authentication level may have a different authentication process than the second authentication level. Each authentication process may include one or more different types of authentication schemes. The first authentication level may be higher, or require authentication (e.g., stepped-up authentication), not needed by, or more than the second authentication level. In some embodiments, the authentication of the user at the first authentication level may be determined as being based on a first authentication process of the first authentication level and a second authentication process of the second authentication level. The authentication may be specific to a resource that is accessible at the first authentication level, but not accessible at the second authentication level. Determining the authentication may include sending, to the computing device, a request for credential information of the user to access one or more resources at the first authentication level. The credential information may be received from the computing device. The authentication of the user at the first authentication level may be determined based on verifying that the credential information.

In some embodiments, in response to receiving a request for access to the resource, a determination may be made as to whether the session is an active session previously being established at the second authentication level based on a second authentication of the user for the second authentication process. Wherein the authentication of the user for the first authentication level is based on the first authentication process and a second authentication process, a request may be sent to the computing device for credential information of the user for the first authentication process. Based on receiving the credential information of the user for the first authentication process, a first authentication of the user for the first authentication process may be determined. The authentication of the first at the first authentication level may be determined based on the first authentication of the user and the second authentication of the user previously determined for the active session.

At step 306, a session is established at an authentication level for the computing device. The authentication level may be based on determining that the user is authenticated based on determining the authentication of the user at step 304. For example, the authentication level may be the first authentication level for which the user is authenticated. The first authentication level may enable the user at the computing device to access the resource. Where the session is an active session, the session can established at the first authentication level based on the active session. The active session may be modified from the second authentication level to the first authentication level for access to the resource.

At step 308, an event is detected. The event is based on one which is to prevent the resource from being accessed by the user at the computing device for the session established for the computing device. Access to the resource by the user at the computing device is prevented by modifying the authentication level of the session to a different authentication level (e.g., the second authentication level), in which access to the resource by the computing device is not permitted.

In some embodiments, the event is a request that is received to prevent that access to the resource at the first authentication level by the computing device. The request may be received after the session is established at the first authentication level. In some embodiments, the event is an expiration of a time period during which the session is active at the authentication level. The event may be configured by a user, such that upon detection, the authentication level of the session may be modified to prevent access to one or more resources.

In some embodiments, access data that indicates a location of a resource (e.g., web page) may be sent to the computing device. The web page, for example, may include one or more interactive elements to request a change in the authentication level of the session. After a session is established at an authentication level, a request to prevent the access to the resource at the first authentication level may be received from the computing device. Receiving the request to prevent access to the resource may be detected as the event. The request may be received in response to interaction with the web page to request a change in the authentication level from the first authentication level to the second authentication level.

In some embodiments, after a session is established at a first authentication level, a request can be received to access one or more resources. The one or more resources may be different from the request for which access is requested at step 304. The one or more resources may include resources accessible at the first authentication level and/or the second authentication level. In one example, the one or more resources may be accessible at the first authentication level because the resources are accessible by the computing device at the second authentication level. The first authentication level may be higher, such that it provides access to resources at the first authentication level and the second authentication level. The request to access the one or more resources may be detected as the event, where one resource is accessible at the second authentication level. The computing device may be enabled to access the one or more resources based on determining that the session is active and that the authentication level of the session is at the first authentication level. In some embodiments, the authentication level may be modified as described below, where the resources are only accessible at the second authentication level.

At step 310, based on the detecting of the event for which to prevent the access to the resource at the first authentication level, the authentication level of the session may be modified from the first authentication level to the second authentication level at which a requested resource is not accessible by the user at the computing device. The modification may be performed to prevent unauthorized access to a resource and/or to reduce the chances of unauthorized access where a lower authentication level is needed.

The process 300 may end at 312.

Figure 4:
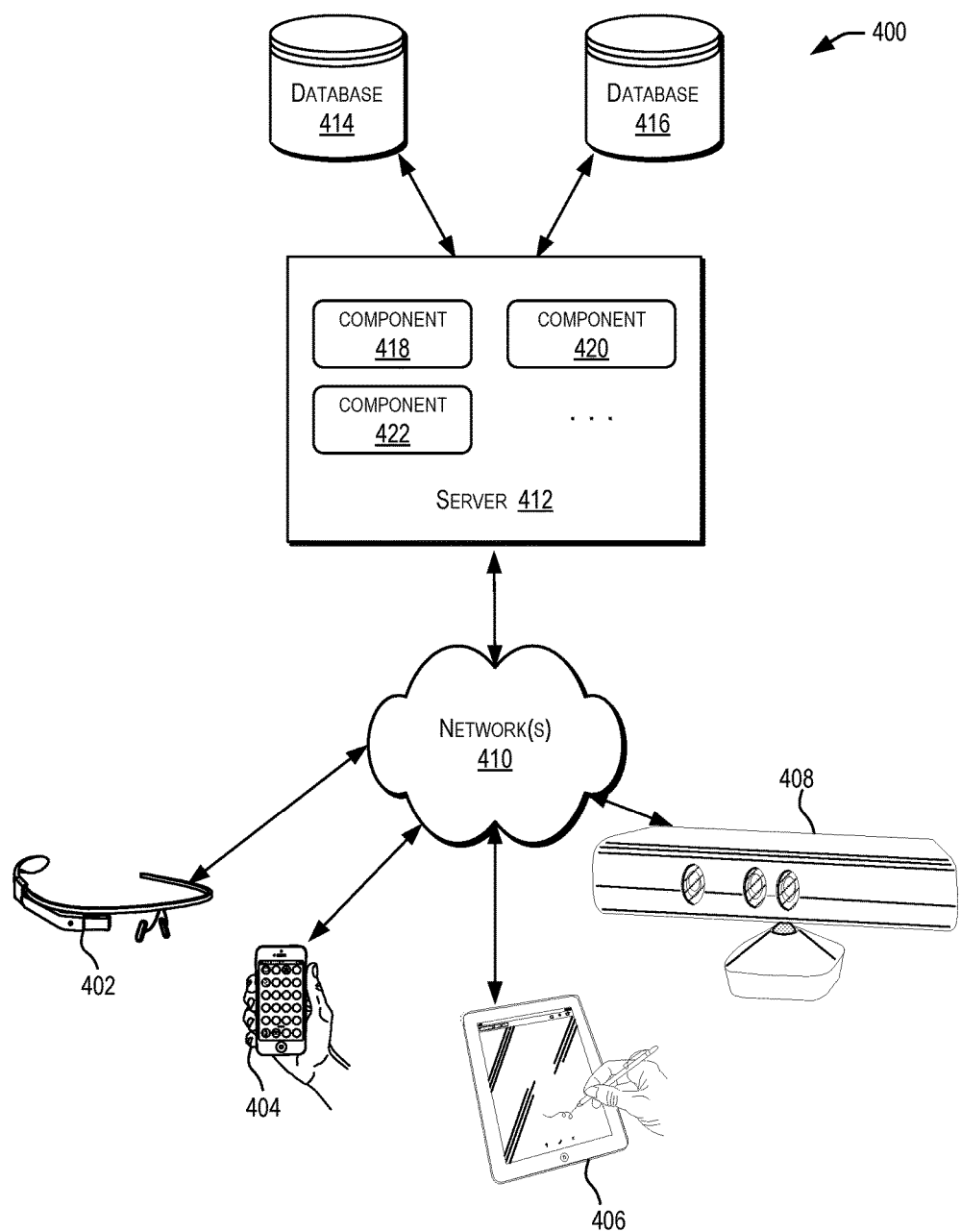
FIG. 4 depicts a simplified diagram of a distributed system for implementing an embodiment.

FIG. 4 depicts a simplified diagram of a distributed system 400 for implementing an embodiment. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications. In certain embodiments, server 412 may also provide other services or software applications can include non-virtual and virtual environments. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in FIG. 4 is thus one example of a distributed system for implementing an embodiment system and is not intended to be limiting.

Client computing devices 402, 404, 406, and/or 408 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 410.

Although distributed system 400 in FIG. 4 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network (s) 410 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization. One or more flexible pools of logical storage devices can be virtualized to maintain virtual storage devices for the server. Virtual networks can be controlled by server 412 using software defined networking. In various embodiments, server 412 may be adapted to run one or more services or software applications described in the foregoing disclosure. For example, server 412 may correspond to a server for performing processing as described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. These databases may provide a mechanism for storing information such as user interactions information, usage patterns information, adaptation rules information, and other information used by embodiments of the present disclosure. Databases 414 and 416 may reside in a variety of locations. By way of example, one or more of databases 414 and 416 may reside on a non-transitory storage medium local to (and/or resident in) server 412.

Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle that are adapted to store, update, and retrieve data in response to SQL-formatted commands.

Figure 5:
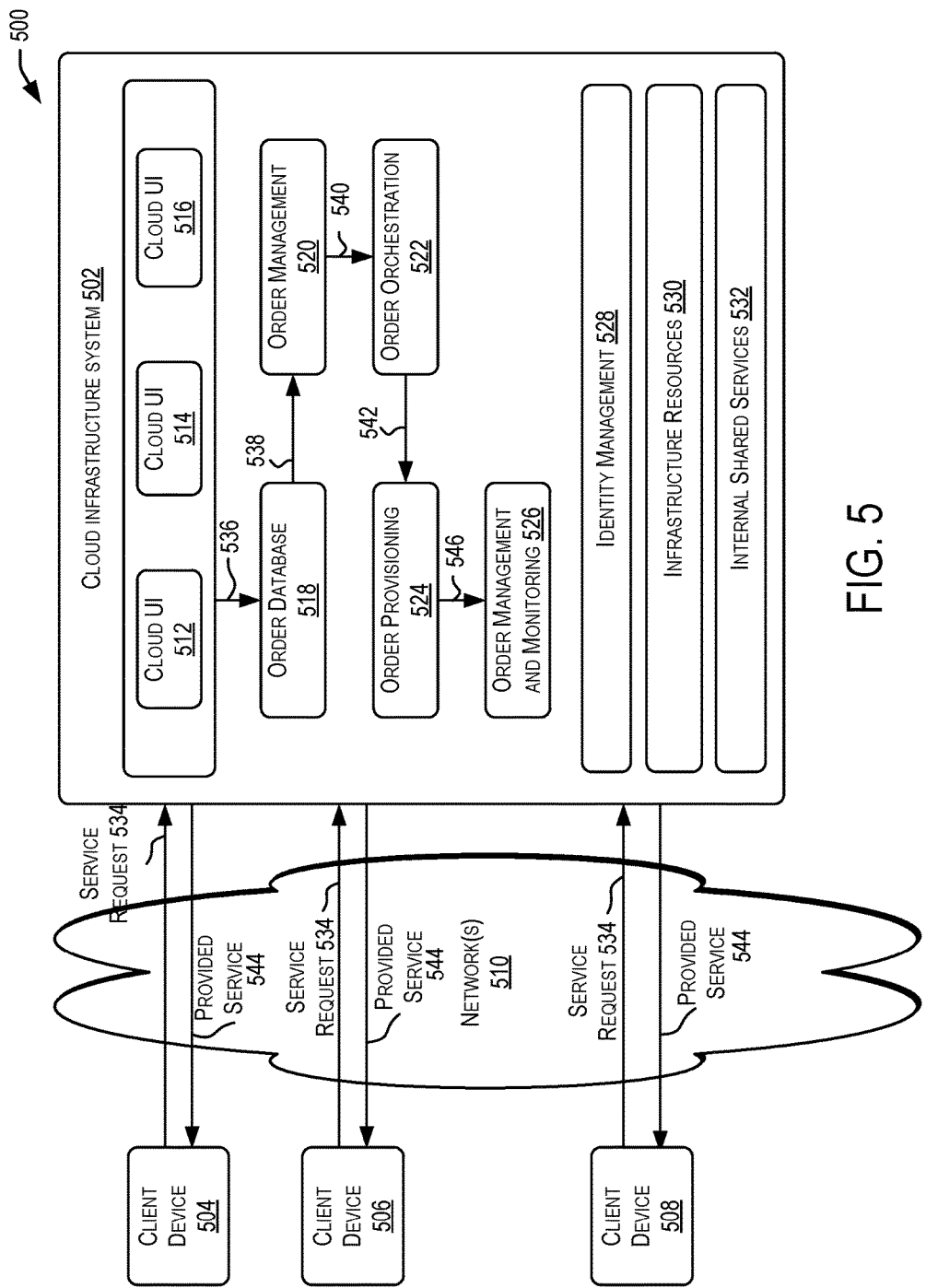
FIG. 5 illustrates a simplified block diagram of one or more components of a system environment in which services may be offered as cloud services, in accordance with an embodiment of the present disclosure.

In some embodiments, a cloud environment may provide one or more services. FIG. 5 is a simplified block diagram of one or more components of a system environment 500 in which services may be offered as cloud services, in accordance with an embodiment of the present disclosure. In the illustrated embodiment in FIG. 5, system environment 500 includes one or more client computing devices 504, 506, and 508 that may be used by users to interact with a cloud infrastructure system 502 that provides cloud services. Cloud infrastructure system 502 may comprise one or more computers and/or servers that may include those described above for server 412.

It should be appreciated that cloud infrastructure system 502 depicted in FIG. 5 may have other components than those depicted. Further, the embodiment shown in FIG. 5 is only one example of a cloud infrastructure system that may incorporate an embodiment of the present disclosure. In some other embodiments, cloud infrastructure system 502 may have more or fewer components than shown in the figure, may combine two or more components, or may have a different configuration or arrangement of components.

Client computing devices 504, 506, and 508 may be devices similar to those described above for client computing devices 402, 404, 406, and 408. Client computing devices 504, 506, and 508 may be configured to operate a client application such as a web browser, a proprietary client application (e.g., Oracle Forms), or some other application, which may be used by a user of the client computing device to interact with cloud infrastructure system 502 to use services provided by cloud infrastructure system 502. Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between client computing devices 504, 506, and 508 and cloud infrastructure system 502. Each network may be any type of network familiar to those skilled in the art that can support data communications using any of a variety of commercially-available protocols, including those described above for network(s) 410.

In certain embodiments, services provided by cloud infrastructure system 502 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 502 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 502 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle Corporation) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 502 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform, and other resources.

In some embodiments, resources in cloud infrastructure system 502 may be shared by multiple users and dynamically re-allocated per demand. Additionally, resources may be allocated to users in different time zones. For example, cloud infrastructure system 502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 to enable provision of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in FIG. 5, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In an exemplary operation, at step 534, a customer using a client device, such as client computing devices 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI) such as cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

At step 536, the order information received from the customer may be stored in an order database 518. If this is a new order, a new record may be created for the order. In one embodiment, order database 518 can be one of several databases operated by cloud infrastructure system 518 and operated in conjunction with other system elements.

At step 538, the order information may be forwarded to an order management module 520 that may be configured to perform billing and accounting functions related to the order, such as verifying the order, and upon verification, booking the order.

At step 540, information regarding the order may be communicated to an order orchestration module 522 that is configured to orchestrate the provisioning of services and resources for the order placed by the customer. In some instances, order orchestration module 522 may use the services of order provisioning module 524 for the provisioning. In certain embodiments, order orchestration module 522 enables the management of business processes associated with each order and applies business logic to determine whether an order should proceed to provisioning.

As shown in the embodiment depicted in FIG. 5, at step 542, upon receiving an order for a new subscription, order orchestration module 522 sends a request to order provisioning module 524 to allocate resources and configure resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. This enables order orchestration module 522 to be isolated from implementation details, such as whether or not services and resources are actually provisioned on the fly or pre-provisioned and only allocated/assigned upon request.

At step 544, once the services and resources are provisioned, a notification may be sent to the subscribing customers indicating that the requested service is now ready for use. In some instance, information (e.g. a link) may be sent to the customer that enables the customer to start using the requested services.

At step 546, a customer's subscription order may be managed and tracked by an order management and monitoring module 526. In some instances, order management and monitoring module 526 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 500 may include an identity management module 528 that is configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
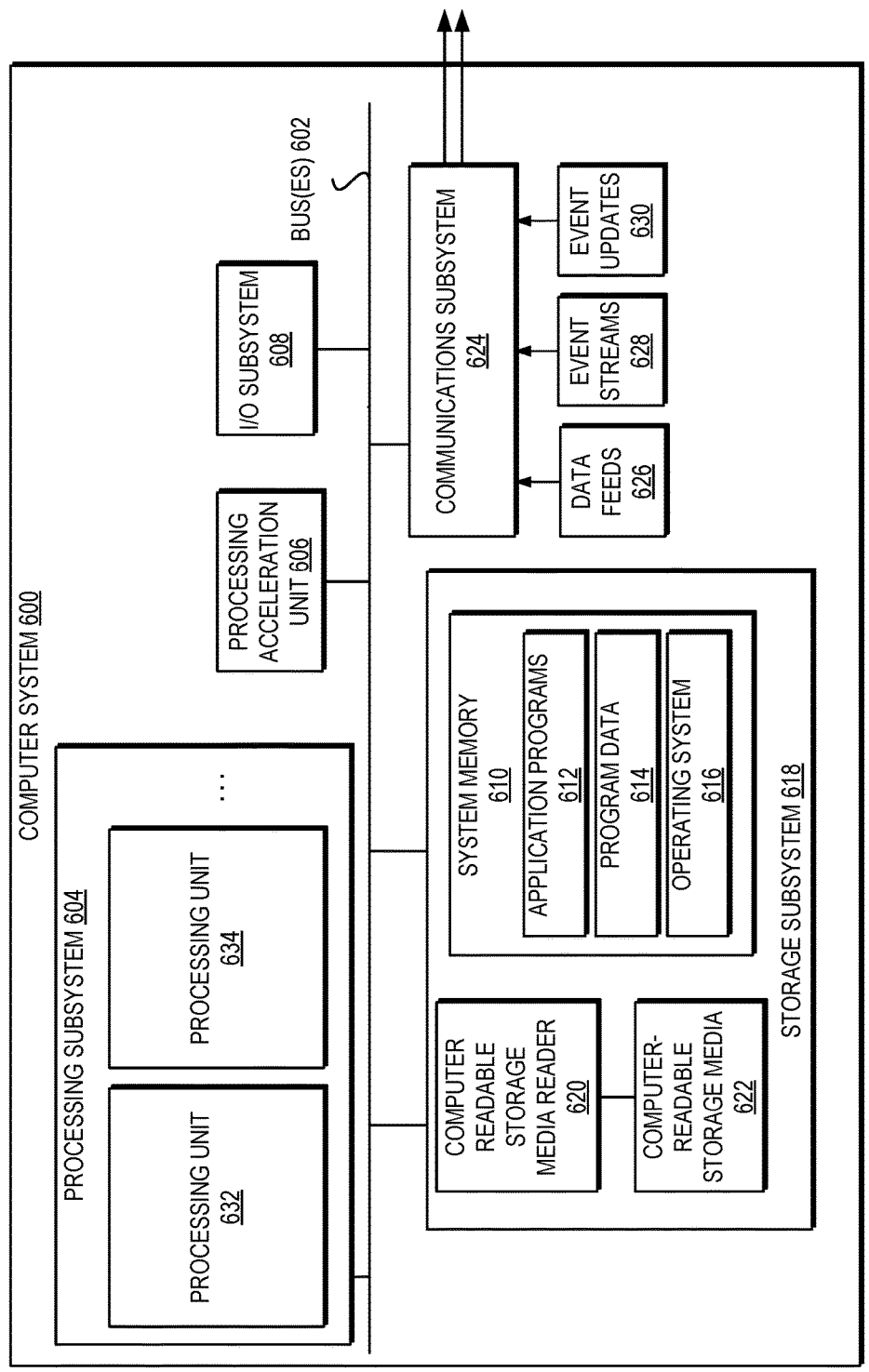
FIG. 6 illustrates an exemplary computer system that may be used to implement an embodiment of the present disclosure.

FIG. 6 illustrates an exemplary computer system 600 that may be used to implement an embodiment of the present disclosure. In some embodiments, computer system 600 may be used to implement any of the various servers and computer systems described above. As shown in FIG. 6, computer system 600 includes various subsystems including a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 may include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processing units 632, 634, etc. A processing unit may include be one or more processors, including single core or multicore processors, one or more cores of processors, or combinations thereof. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities disclosed herein.

In certain embodiments, a processing acceleration unit 606 may be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term "input device" is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some embodiments. Software (programs, code modules, instructions) that when executed by processing subsystem 604 provide the functionality described above may be stored in storage subsystem 618. The software may be executed by one or more processing units of processing subsystem 604. Storage subsystem 618 may also provide a repository for storing data used in accordance with the present disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM) or dynamic random access memory (DRAM).

By way of example, and not limitation, as depicted in FIG. 6, system memory 610 may store application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 may store programming and data constructs that provide the functionality of some embodiments. Software (programs, code modules, instructions) that when executed by processing subsystem 604 a processor provide the functionality described above may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 622 may provide storage of computer-readable instructions, data structures, program modules, and other data for computer system 600.

In certain embodiments, storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for storing computer-readable information.

In certain embodiments, computer system 600 may provide support for executing one or more virtual machines. Computer system 600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 600. Accordingly, multiple operating systems may potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client computing devices via the Internet for receiving and sending information from and to the client computing devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, communications subsystem 624 may receive input communication in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving, at an access agent of a single-sign-on gateway, a first request to access a first resource from a computing device by a user, wherein the first resource is provided by a resource computer system;
   communicating, by the access agent, with an authorization engine of an access management system to identify a first authentication level at which access to the first resource is permitted;
   in response to identifying the first authentication level, determining, by a session engine of the access management system, authentication of the user at the first authentication level;

based on determining that the user is authenticated at the first authentication level, establishing, by the session engine, a single-sign-on session at an authentication level for the computing device, wherein the authentication level of the session is the first authentication level that enables the user at the computing device to access the first resource provided by the resource computer system;

receiving, at the access agent, a second request to access a second resource from the computing device by the user;

communicating, by the access agent, with the authorization engine of the access management system to identify a second authentication level at which access to the second resource is permitted, wherein the first authentication level is different from the second authentication level at which the first resource is not accessible;

determining, by the session engine, that the received second request is an event for reducing the authentication level for the computing device;

modifying, by the session engine, the authentication level of the single sign-on session for the computing device from the first authentication level to the second authentication level based on the determination of the event, wherein the access to the first resource by the user at the computing device is prevented by modifying the authentication level of the single-sing-on session to the second authentication level; and sending, by the session engine, information concerning the modification of the authentication level to the access agent to indicate to the access agent that the authentication level of the single sign-on session for the computing device has changed from the first authentication level to the second authentication level.

2. The method of claim 1, further comprising enabling, by the session engine, the computing device to access the second resource based on determining that the single sign-on session is active and that the authentication level of the single sign-on session is at the first authentication level.

3. The method of claim 1, further comprising:
sending, to the computing device, a request for credential information of the user to access the first resource at the first authentication level;
receiving, from the computing device, the credential information; and
determining the authentication of the user at the first authentication level based on verifying the credential information.

4. A system comprising:
one or more processors; and
a memory accessible to the one or more processors, the memory storing one or more instructions that, upon execution by the one or more processors, causes the one or more processors to:
receive a first request to access a first resource from a computing device by a user, wherein the first resource is provided by a resource computer system;
identify a first authentication level at which access to the first resource is permitted;
in response to identifying the first authentication level, determine authentication of the user at the first authentication level;
based on determining that the user is authenticated at the first authentication level, establish a single sign-on session at an authentication level for the computing device, wherein the authentication level of the session is the first authentication level that enables the user at the computing device to access the first resource provided by the resource computer system;
after the single sign-on session is established at the first authentication level, receive a second request to access a second resource from the computing device by the user;
identify a second authentication level at which access to the second resource is permitted, wherein the first authentication level is different from the second authentication level at which the first resource is not accessible;
determine that the received second request is an event for reducing the authentication level for the computing device,
modify the authentication level of the single sign-on session for the computing device from the first authentication level to the second authentication level based on the determination of the event, wherein the access to the first resource by the user at the computing device is prevented by modifying the authentication level of the single sign-on session to the second authentication level; and
sending information concerning the modification of the authentication level to an access agent to indicate to the access agent that the authentication level of the single sign-on session for the computing device has changed from the first authentication level to the second authentication level.

5. The system of claim 4, wherein the system is included in an access management system.

6. The system of claim 4, wherein the one or more instructions that, upon execution by the one or more processors, further causes the one or more processors to enable the computing device to access the second resource based on determining that the single sign-on session is active and that the authentication level of the single sign-on session is at the first authentication level.

7. A non-transitory computer-readable medium storing one or more instructions that, upon execution by one or more processors, causes the one or more processors to:
receive, at a computer system of an access management system a first request to access a first resource from a computing device by a user, wherein the first resource is provided by a resource computer system;
identify, by the computer system, a first authentication level at which access to the first resource is permitted;
in response to identifying the first authentication level, determine, by the computer system, authentication of the user at the first authentication level;
based on determining that the user is authenticated at the first authentication level, establish, by the computer system, a single sign-on session at an authentication level for the computing device, wherein the authentication level of the session is the first authentication level that enables the user at the computing device to access the first resource provided by the resource computer system;
after the single sign-on session is established at the first authentication level, receive, at the computer system, a second request to access a second resource from the computing device by the user;
identify, at the computer system, a second authentication level at which access to the second resource is permitted, wherein the first authentication level is different from the second authentication level at which the first resource is not accessible;

determine, by the computer system, that the received second request is an event for reducing the authentication level for the computing device;

modify, by the computer system, the authentication level of the single sign-on session for the computing device from the first authentication level to the second authentication level based on the determination of the event, wherein the access to the first resource by the user at the computing device is prevented by modifying the authentication level of the single sign-on session to the second authentication level; and send, by the computer system, information concerning the modification of the authentication level to an access agent to indicate to the access agent that the authentication level of the single sign-on session for the computing device has changed from the first authentication level to the second authentication level.

8. The non-transitory computer-readable medium of claim 7, wherein the one or more instructions that, upon execution by the one or more processors, further causes the one or more processors to enable the computing device to access the second resource based on determining that the single sign-on session is active and that the authentication level of the single sign-on session is at the first authentication level.

9. The non-transitory computer-readable medium of claim 7, wherein the non-transitory computer-readable medium is part of the access management system.

* * * * *

UNITED STATES PATENT AND TRADEMARK OFFICE
CERTIFICATE OF CORRECTION

PATENT NO. : 10,257,205 B2  
APPLICATION NO. : 15/294381  
DATED : April 9, 2019  
INVENTOR(S) : Mathew et al.

Page 1 of 1

It is certified that error appears in the above-identified patent and that said Letters Patent is hereby corrected as shown below:

In the Specification

In Column 2, Line 29, delete "that that" and insert -- that --, therefor.

In Column 16, Line 65, delete "("SSOEngine 142)" and insert -- ("SSOEngine 142") --, therefor.

Signed and Sealed this  
Third Day of November, 2020

Andrei Iancu  
*Director of the United States Patent and Trademark Office*